US 8,555,812 B2

(12) United States Patent
Nowacek

(10) Patent No.: US 8,555,812 B2
(45) Date of Patent: Oct. 15, 2013

(54) REMOTE MONITORING SYSTEM FOR GROUND-BASED GAME FEEDER, VARMINT GUARD, TRAY AND SKIRT ASSEMBLY AND QUAIL FEEDER

(76) Inventor: David Nowacek, San Antonio, TX (US)

(*) Notice: Subject to any disclaimer, the term of this patent is extended or adjusted under 35 U.S.C. 154(b) by 469 days.

(21) Appl. No.: 12/886,379

(22) Filed: Sep. 20, 2010

(65) Prior Publication Data

US 2011/0088625 A1    Apr. 21, 2011

Related U.S. Application Data

(60) Provisional application No. 61/243,585, filed on Sep. 18, 2009.

(51) Int. Cl.
*A01K 5/02* (2006.01)

(52) U.S. Cl.
USPC .................................. 119/51.02; 119/61.2

(58) Field of Classification Search
USPC ............... 119/51.02, 52.1, 52.4, 57.1, 57.91, 119/57.92, 61.2
See application file for complete search history.

(56) References Cited

U.S. PATENT DOCUMENTS

| | | | |
|---|---|---|---|
| 582,410 A | 5/1897 | Young | 119/52.4 |
| 1,192,487 A | 7/1916 | Zok | 119/51.01 |
| 1,497,596 A | 6/1924 | Scott | 119/52.1 |
| 1,520,607 A | 12/1924 | Smith | 119/52.1 |
| 1,537,337 A | 5/1925 | De Angulo | 119/80 |
| 2,515,698 A | 7/1950 | Wheeler | 119/53 |
| 2,534,442 A | 12/1950 | Hargey | 119/53 |
| D164,213 S | 8/1951 | White | D30/132 |
| 2,585,400 A | 2/1952 | Morton | 119/51.01 |
| D168,337 S | 12/1952 | Cusenbarg | D30/121 |
| 2,972,334 A | 2/1961 | Braden | 119/51.01 |
| 3,270,985 A | 9/1966 | Schmidt | 244/165 |
| 3,506,218 A | 4/1970 | <issell | 244/158.1 |
| D218,831 S | 9/1970 | Leeming | D30/129 |
| 3,717,127 A | 2/1973 | Porterfield | 119/57.7 |
| 3,730,139 A | 5/1973 | Moore | 119/429 |
| D236,012 S | 7/1975 | Crawford | D30/122 |
| 3,911,868 A | 10/1975 | Brembeck | 119/53 |
| D239,546 S | 4/1976 | Kitson | D30/121 |
| 3,962,997 A | 6/1976 | Ruth | |
| 4,070,990 A | 1/1978 | Swartzendruber | 119/53 |
| 4,401,057 A | 8/1983 | Van Gilst | 119/57.4 |
| 4,834,026 A | 5/1989 | Brembeck | 119/53 |
| 4,841,912 A | 6/1989 | Oswald | 119/53 |
| D302,750 S | 8/1989 | Brembeck | D30/122 |
| 4,889,078 A | 12/1989 | Smiley | 119/53.5 |
| D309,963 S | 8/1990 | Cureton | D30/122 |
| 4,945,859 A | 8/1990 | Churchwell | 119/57.91 |
| 4,995,343 A | 2/1991 | Cole | 119/53 |
| 5,066,388 A | 11/1991 | Ross | |

(Continued)

*Primary Examiner* — Yvonne Abbott

(74) *Attorney, Agent, or Firm* — Jackson Walker, LLP

(57) ABSTRACT

A game feeder configured for remote monitoring, the game feeder comprising a feeder body comprising a container for holding feed, a motor configured to disperse the feed, and a motor relay configured to actuate the motor; a computer, the computer comprising a wireless driver configured to communicatively couple the computer to a wireless communication network; and a sensor array having a plurality of sensors adapted to provide data on a plurality of local conditions at the game feeder, the sensor array being communicatively coupled to the computer; wherein the computer is configured to receive the data on the plurality of local conditions from the sensor array and send the data on the plurality of local conditions to the wireless communication network.

9 Claims, 4 Drawing Sheets

(56) References Cited

U.S. PATENT DOCUMENTS

| | | | |
|---|---|---|---|
| D338,694 S | 8/1993 | Krebs | D21/452 |
| D339,429 S | 9/1993 | Reid | D30/121 |
| D347,461 S | 5/1994 | Bertrand | D21/451 |
| 5,463,980 A | 11/1995 | Rasmussen | 119/57.1 |
| 5,533,648 A * | 7/1996 | Read et al. | 222/108 |
| D374,952 S | 10/1996 | Wenstrand | D30/132 |
| D403,131 S | 12/1998 | Bowell | D30/132 |
| 5,855,943 A | 1/1999 | Lush et al. | |
| 5,927,232 A | 7/1999 | Pollock | 119/53 |
| 5,941,193 A | 8/1999 | Cole | 119/57.4 |
| 6,082,300 A * | 7/2000 | Futch | 119/51.11 |
| 6,173,676 B1 | 1/2001 | Cole | 119/57.4 |
| 6,439,159 B1 | 8/2002 | Rizzo | 119/72 |
| 6,571,734 B1 | 6/2003 | Finkelaw | 119/57.91 |
| 6,575,117 B1 | 6/2003 | Rasmussen | 119/57.1 |
| 6,748,898 B2 * | 6/2004 | Ulman et al. | 119/57.92 |
| 6,761,129 B1 | 7/2004 | Smith | 119/52.1 |
| 6,779,487 B1 * | 8/2004 | Kochan | 119/51.11 |
| D505,522 S | 5/2005 | Jurk | D30/131 |
| 6,899,056 B1 | 5/2005 | Kelly | |
| D512,538 S | 12/2005 | Bird | D30/121 |
| 7,028,635 B1 | 4/2006 | Eastman | 119/51.11 |
| 7,107,932 B2 | 9/2006 | Cole | 119/53 |
| 7,228,817 B2 | 6/2007 | Busse | 119/53 |
| 7,314,406 B2 | 1/2008 | Billnovich | 452/185 |
| 7,513,216 B2 * | 4/2009 | Neckel | 119/51.02 |
| 7,552,697 B2 | 6/2009 | Busse | 119/53 |
| 7,966,971 B2 * | 6/2011 | Zimmerman | 119/51.02 |
| 8,049,630 B2 * | 11/2011 | Cheng et al. | 340/573.3 |
| 8,286,587 B2 * | 10/2012 | Sladkowski et al. | 119/51.11 |
| 8,347,817 B1 * | 1/2013 | Miller | 119/56.1 |
| 2005/0132966 A1 | 6/2005 | Hartsell | 119/52.1 |
| 2005/0263083 A1 | 12/2005 | Coroneos | 119/57.1 |
| 2006/0225658 A1 | 10/2006 | Baynard | 119/57.8 |
| 2008/0202435 A1 | 8/2008 | Nowacek | 119/51.01 |
| 2009/0038552 A1 * | 2/2009 | Baker et al. | 119/14.03 |
| 2011/0192213 A1 * | 8/2011 | Zimmerman et al. | 73/23.3 |

\* cited by examiner

REMOTE MONITORING SYSTEM FOR GROUND-BASED GAME FEEDER, VARMINT GUARD, TRAY AND SKIRT ASSEMBLY AND QUAIL FEEDER

CROSS REFERENCE TO RELATED APPLICATIONS

This application claims the benefit of U.S. Provisional Application No. 61/243,585 filed Sep. 18, 2009.

U.S. provisional patent application 60/903,786 filed Feb. 27, 2007, U.S. non-provisional patent application Ser. No. 12/069,371 filed Feb. 8, 2008, and U.S. patent publication US2008/0202435, published Aug. 28, 2008, are incorporated herein by reference.

BACKGROUND

This specification relates to the field of remote monitoring and assessment, and more particularly to a remote monitoring addition for a ground-based game feeder.

SUMMARY OF THE INVENTION

A game feeder configured for remote monitoring, the game feeder comprising a feeder body comprising a container for holding feed, a motor configured to disperse the feed, and a motor relay configured to actuate the motor; a computer, the computer comprising a wireless driver configured to communicatively couple the computer to a wireless communication network; and a sensor array having a plurality of sensors adapted to provide data on a plurality of local conditions at the game feeder, the sensor array being communicatively coupled to the computer; wherein the computer is configured to receive the data on the plurality of local conditions from the sensor array and send the data on the plurality of local conditions to the wireless communication network.

DETAILED DESCRIPTION OF THE EMBODIMENTS

Figure 1:
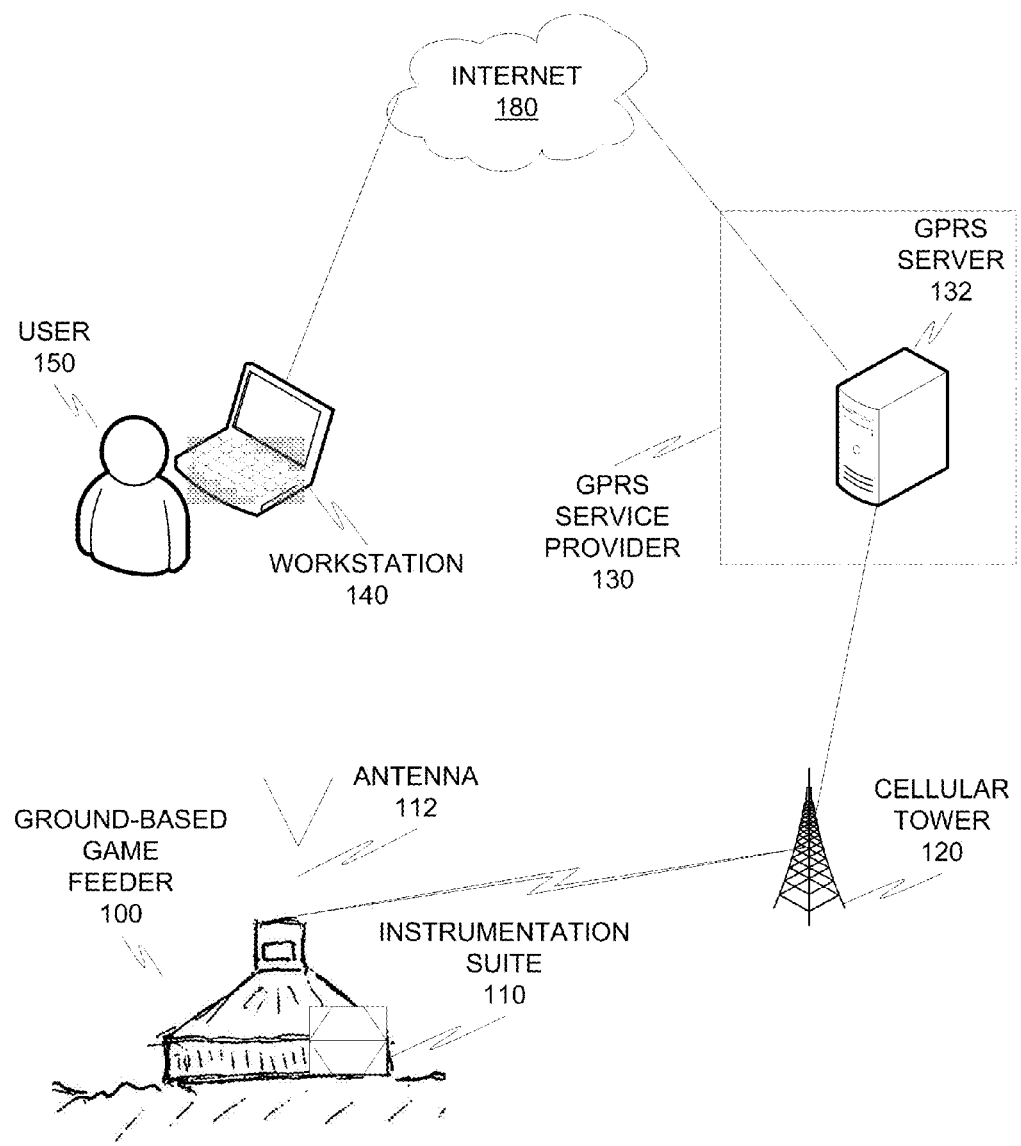
FIG. 1 is a network diagram disclosing a network topology of an embodiment of a remote monitoring system for a ground-based game feeder.

A remote monitoring system can enhance the benefits of a ground-based game feeder or other game feeder system. The advantages and operation of a ground based game feeder were described in the previous application. The remote monitoring system of the present application provides additional flexibility to the user of the ground-based game feeder. In general, the remote monitoring system includes an instrumentation suite that monitors local conditions around the game feeder. The instrumentation suite may include such elements as a rainfall sensor, barometer, thermometer, hydrometer, and camera. These sensors are selected to provide environmental data for the game feeder so that the user is aware of conditions at the hunting site. In particular, the camera may provide data as to which animals are approaching the game feeder. The camera can be selected to have a motion-activated trigger, so that it will take pictures when animals approach the feeder to feed. This allows the hunter to see which animals are feeding at the site and particularly to discover whether desirable game is available at the location. Advantageously, the present disclosure provides means for the hunter to receive information about the site conveniently and instantaneously. In contrast, without the benefits of the present disclosure, the hunter would have to physically travel to the location of the game feeder, download pictures, view sensor data, and program the feeder.

In one embodiment, the sensor array is connected to a single board computer or other similar computation device, which may be ruggedized or shielded for use in rough external environments. The single board computer may be powered by a rechargeable battery, which can be connected to solar panels for extended long term use. The single board computer also may be connected to an antenna that allows it to communicate with a cellular or other wireless network. For example, the antenna may place a single board computer in communication with a general packet radio open service (GPRS) server, which may provide access to the internet over a cellular network. The GPRS server may then relay traffic through the internet to a user workstation, where the user can use the workstation to access available sensor data, download pictures, view present and historical environmental conditions, program the feeder, and even instruct the feeder to take action such as drive a single, unscheduled disbursement of feed.

A remote monitoring system will now be described with more particular reference to the attached drawings. Hereafter, details are set forth by way of example to facilitate discussion of the disclosed subject matter. It should be apparent to a person of ordinary skill in the art, however, that the disclosed embodiments are exemplary and not exhaustive of all possible embodiments. Throughout this disclosure, a hyphenated form of a reference numeral refers to a specific instance or example of an element and the un-hyphenated form of the reference numeral refers to the element generically or collectively. Thus, for example, 102-1 may refer to a "pen," which may be an instance or example of the class of "writing implements." Writing implements may be referred to collectively as "writing implements 102" and any one may be referred to generically as a "writing implement 102."

FIG. 1 discloses a network topology of an embodiment of a monitoring system for a ground-based game feeder. As disclosed in this drawing, a ground-based game feeder 100 is provided with an instrumentation suite 110 and an antenna 112. The instrumentation suite 110 collects environmental and other useful data, which can be relayed through antenna 112 to a cellular tower 120. Although a cellular tower and a cellular network are disclosed, it should be noted that the methods of the present disclosure could also be used with any suitable wireless technology, such as satellite technology, ad-hoc wireless networks, such as IEEE 802.11 or Bluetooth, and other similar wireless technologies. In this exemplary embodiment, cellular tower 120 relays network traffic to GPRS server 132. GPRS server 132 is operated by a GPRS service provider 130. GPRS server 132 translates traffic on the cellular network into internet traffic. GPRS server 132 then forwards appropriate data packets through internet 180 to user workstation 140, which is operated by user 150. Under the disclosed configuration, user 150 is able to communicate with ground-based game feeder 100 via workstation 140.

Communication between user 150 and ground-based game feeder 100 may be bidirectional and can include transfer of data, transfer of commands, and remote control.

Figure 1A:
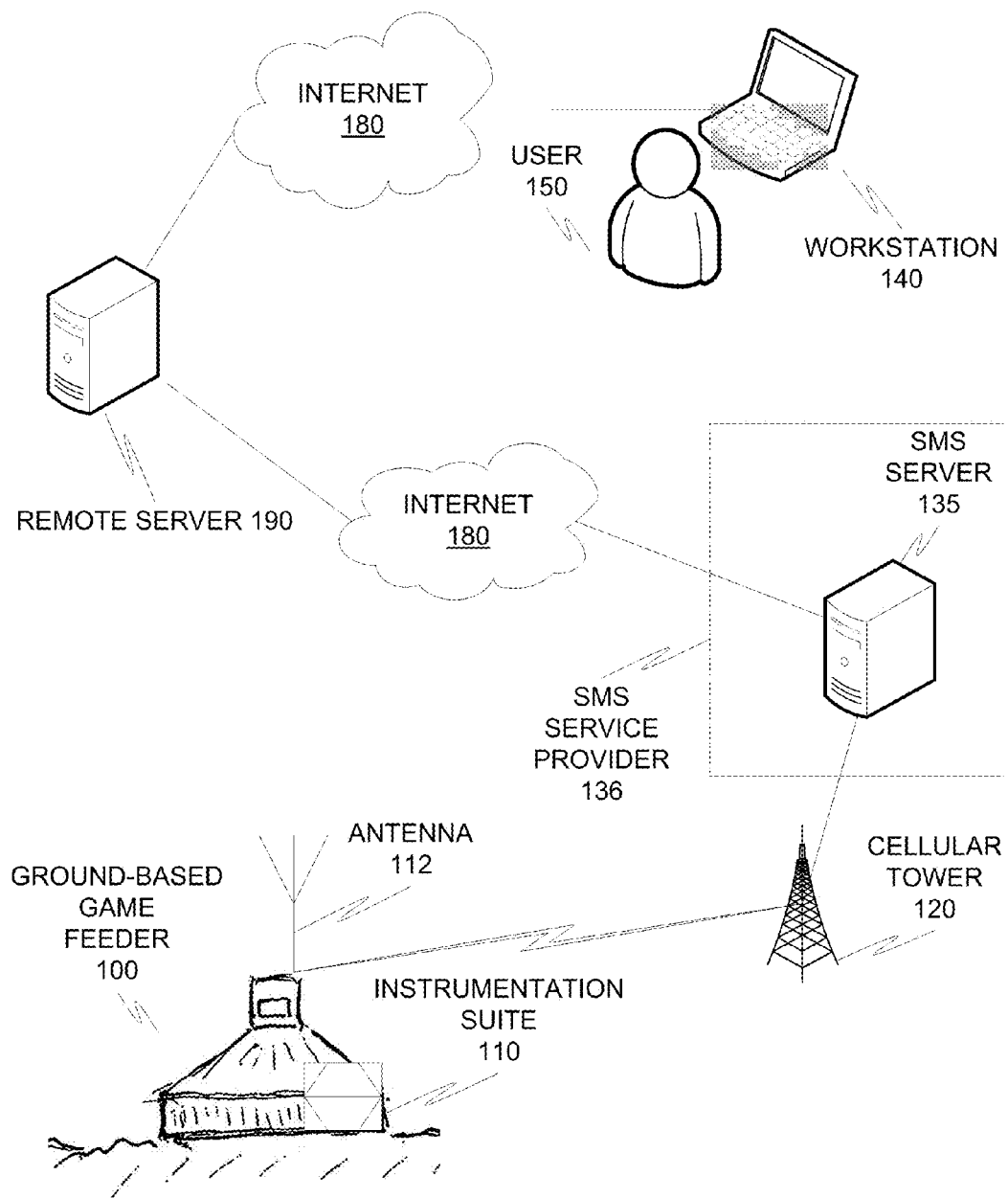
FIG. 1A is a network diagram disclosing a network topology of an alternative embodiment of a remote monitoring system for a ground-based game feeder.

FIG. 1A discloses a network topology of an alternative embodiment of a monitoring system for a ground-based game feeder. In this embodiment, user 150 uses workstation 140 to log into a remote server 190 through internet 180. User 150 may then issue commands to and receive data from ground-based game feeder 100. For example, a command from user 150 may be transmitted from workstation 140 through internet 180 to remote server 190. Remote server 190 may send the command through internet 180 to a Short Message Service (SMS) server 135, operated by a SMS service provider 136. The SMS server 135 translates internet traffic into traffic on the cellular network, forwarding appropriate data packets to cellular tower 120. Antenna 112 of ground-based game feeder 100 receives transmissions from cellular tower 120. The command from user 150 may instruct the ground-based game feeder 100 to take action; for example, user 150 may instruct ground-based game feeder 100 to take measurements with instrumentation suite 110, such as taking a picture or measuring the temperature, or to disburse feed. It should be noted that the methods of the present disclosure could use different wireless technologies for sending and receiving data. For example, ground-based game feeder 100 may transmit pictures and environmental and other useful data using GPRS, but may receive commands and remote control instructions using SMS.

Figure 2:
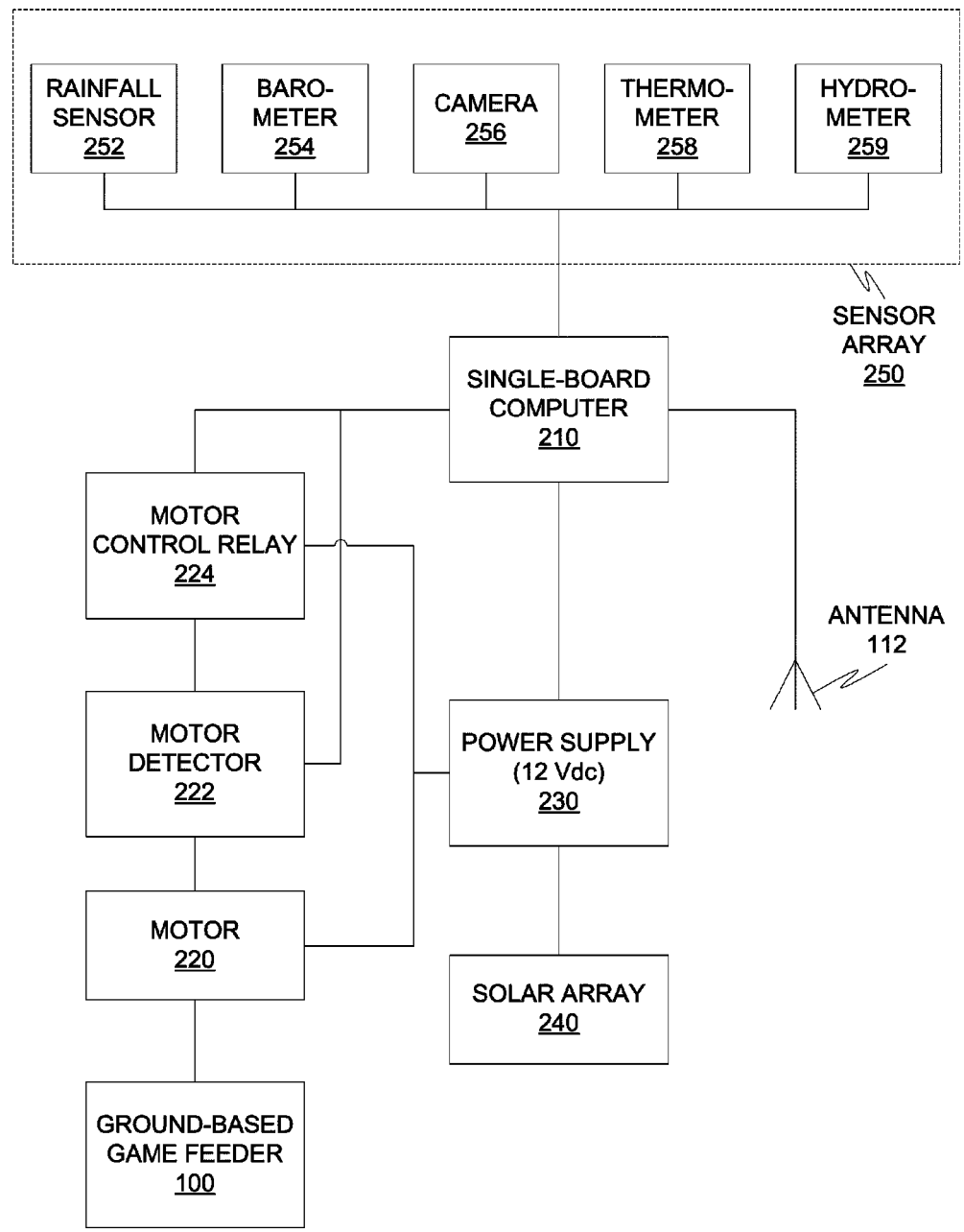
FIG. 2 is a block diagram disclosing entry relations between components of a remote monitoring system for a ground-based game feeder.

FIG. 2 is a block diagram of a remote monitoring system for a ground-based game feeder. Ground-based game feeder 100 includes a motor 220, which is configured to disburse feed upon receipt from a signal. Motor detector 222 is connected to motor 220 and provides feedback data for monitoring the functionality of motor 220. A motor control relay 224 is connected to motor 220, and provides the necessary signal for motor 220 to disburse feed. Motor control relay 224 actuates motor 220, causing the disbursal of feed. A single board computer 210 connects to motor control relay 224 to provide the necessary signal to cause motor control relay 224 to actuate motor 220. Single board computer 210 is connected to antenna 112, through which single board computer 210 is enabled to communicate with a wireless network. While a single board computer 210 is disclosed as an exemplary embodiment, any suitable control device could be used. For example, a simple off-the-shelf computer could be used in place of single board computer 210. Single board computer 210 is also connected to a sensor array 250. Sensor array 250 may include a plurality of environmental and other sensors. For example, sensor array 250 may include such sensors as a rainfall sensor 252, a barometer 254, a camera 256, a thermometer 258, and a hydrometer 259. The suite of instruments in sensor array 250 are selected in this case to provide data that are useful to a hunter wanting to monitor ground-based game feeder 100. For example, rainfall sensor 252 will provide information on the rate of rainfall in the area and when it is actually raining. Barometer 254 may be used to assess current weather patterns. Thermometer 258 may be used to assess current temperature. A hydrometer may be used to indicate relative humidity and camera 256 may include a motion activated sensor, which will permit camera 256 to take pictures of animals approaching ground-based game feeder 100. This may permit the hunter to determine whether there is desirable game feeding at the game feeder, and to assess hunting conditions.

The camera 256 in FIG. 2 may have several modes of operation which may be selected by user 150. For example, the modes of operation of camera 256 may include a mode for taking pictures at a fixed time interval, a mode for taking pictures when feed is being disbursed, and a mode for taking pictures when the motion activated sensor is triggered. Each mode of operation of camera 256 may have several programmable settings. For example, in the mode for taking pictures at a fixed time interval, the time interval may be programmable. In the mode for taking pictures when the motion activated sensor is triggered, there may be a programmable start time and total duration time, which may allow the camera 256 to take pictures at times when the desirable game is more active. Each mode of operation of camera 256 may also include a programmable delay interval to allow time between photographs for transmitting the photographs to the cellular tower 120. Typically, a delay interval of 5 minutes is sufficient to transmit a low resolution picture over GPRS. The mode of operation for camera 256 and the programmable settings may be remotely modified by user 150.

Single board computer 210, motor 220 and other components can be powered by power supply 230. For example power supply 230 may be a 12-volt DC power supply, which may include a rechargeable battery in order to maximize the ability of ground-based game feeder 100 to operate for extended periods of time without intervention. A solar array 240 may be provided to recharge power supply 230. The level of power in power supply 230 may be monitored by the single board computer 210 and transmitted to user 150 via remote server 190 or workstation 140. For example, the ground-based game feeder 100 may periodically transmit a communication with system information or statistics, part of which may be power level information. If the power level of power supply 230 is low, a sleep instruction may be sent to ground-based game feeder 100. The sleep instruction may be automatically transmitted by remote server 190 or workstation 140, or manually transmitted by user 150.

Figure 3:
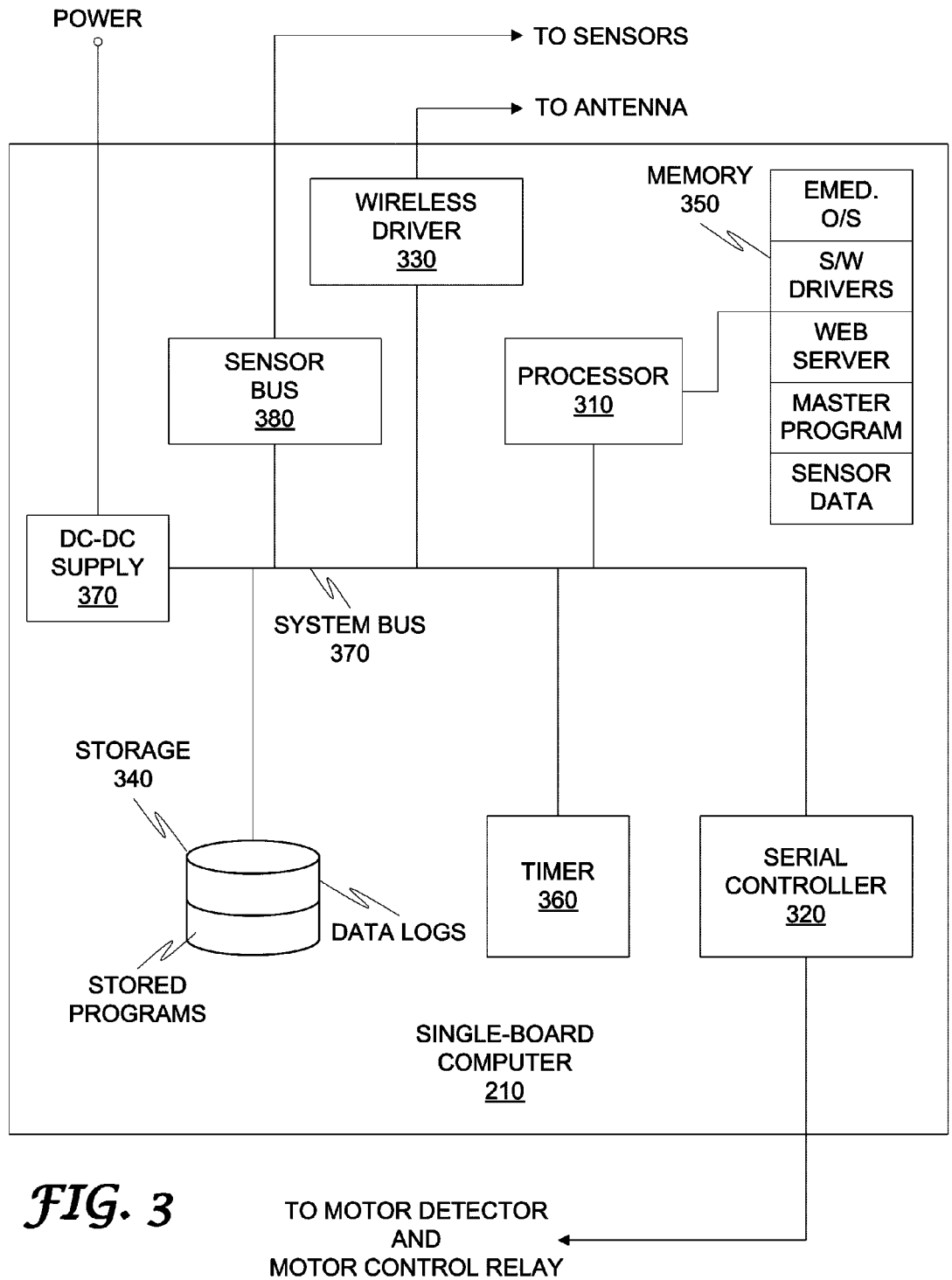
FIG. 3 is a block diagram of a single board computer used in one embodiment of a remote monitoring system for a ground-based game feeder.

FIG. 3 discloses a block diagram of single board computer 210 in an exemplary embodiment of a remote monitoring system for a ground-based game feeder. Single board computer 210 is controlled by a processor 310 which connects to other system components via a system bus 370. Processor 310 may be any kind of suitable processing device, such as a microprocessor, digital signal processor, field-programmable gate array, applications-specific integrated circuit, or the like. In some embodiments, processor 310 may also be directly connected to a memory 350, thereby providing direct memory access. In some embodiments, memory 350 may be a high-speed volatile memory technology such as random access memory (RAM), or other similar low latency technology. Stored in memory 350 may be such elements as an embedded operating system, software drivers, a web server, a master data collection program, and stored sensor data. For example, software drivers may enable the embedded operating system to communicate with a sensor bus 380, which provides a hardware and/or software conduit to sensor array 250. The master program may then be able to collect data from sensor array 250 and store the data in memory 350. A web server provides an interactive means for a user to view data and interact with the remote monitoring system. Processor 310 is also connected to a wireless driver 330, which may also be enabled to communicate to embedded operating system through software drivers. Wireless driver 330 is connected to antenna 112, and communicatively couples processor 310 to the wireless network. In this embodiment, processor 310 uses the web server to provide a graphical user interface to user 150 over wireless driver 330 via the internet 180. This two-way communication permits user 150 both to view sensor data, and to manipulate functions of single board computer 210. Single board computer 210 further includes a timer circuit 360, which provides processor 310 time-based signals. For example, if user 150 wants ground-based feeder 100 to disburse feed two times per day at a specified time, then timer 360 can track the time between disbursements and provide a signal to processor 310 when it is time for a new disbursement of feed. When processor 310 receives a signal from timer 360, it may then provide a signal to serial controller 320, which is connected to the motor detector 222 and motor control relay 224. This causes motor control relay 224 to actuate motor 220, causing the feed disbursement. There is also shown in this figure a storage 340 which may be a higher-latency technology than memory 350, but which may be a non-volatile storage area. Storage 340 may include such information as data logs and stored programs, which will be maintained over long term operation. There is also shown an exemplary DC-DC power supply 370 which receives power from power supply 230, and distributes power to other system components.

It should be noted that the above description of single board computer 210 is divided into functional blocks. While each functional block may represent a separate hardware or software component in some embodiments, other embodiments may combine the functions of several blocks into a single hardware or software component. In other embodiments, one function may be spread across a plurality of hardware and software components. It is therefore not the intention of this specification to limit the claims to the specific configuration disclosed.

The signals are digitized in a manner known in the art and power may be supplied to any sensing devices. Images may be dumped real time to a remote server 190 and accessed by the user when the user 150 signs on. The level of feed in ground-based feeder 100 may be directly measured or estimated. For example, the level of feed may be estimated based on (1) the total amount of time that motor 220 has run and (2) the volume or weight of feed disbursed per unit time. Low level feed signal information may be provided to user 150 to indicate level of feed in the game feeder.

The materials of which the base and other elements of the game feeder are comprised is typically UV resistant polyethylene plastic. Brass inserts may be used to secure fastening. Typically the entire game feeder may be about 50 inches tall with a base about 48 inches in diameter. The motor may be a heavy duty 12 volt, 5.1 amp with a permanent DC magnet. Solar panel 12 volt,kk 70 milliamps may be provided and timers known in the trade, including heavy duty programmable timers, may be provided.

Although the present disclosure has described a remote monitoring system in particular reference to a ground-based game feeder, it should be noted that a similar configuration can be used for a multitude of monitoring purposes. For example, a remote monitoring system could be employed to increase security of a storage facility or other facility that is not frequently visited by people, or that is left alone for extended periods of time. Similarly, a remote monitoring system can be used to provide monitoring and assessment of any area where a user needs a frequent stream of information and means of control but cannot visit regularly. Another application may be, for example, a vacation home that the user visits only during certain seasons of the year. The remote monitoring system could be used to provide security while the user is away from the vacation home and when the user is preparing to visit the vacation home, it can be used to, for example, remotely activate utilities and perform such tasks as automatically turning on the heat or air-conditioning to prepare the home for the arrival of the user. Based on the present disclosure, other abundant users will become apparent to those having skill in the art.

While the subject of this specification has been described in connection with one or more exemplary embodiments, it is not intended to limit the claims to the particular forms set forth. On the contrary, the appended claims are intended to cover such alternatives, modifications and equivalents as may be included within their spirit and scope.

What is claimed is:

1. A game feeder configured for remote monitoring, the game feeder comprising:
    a feeder body comprising a container for holding feed, a motor configured to disperse the feed, and a motor relay configured to actuate the motor;
    a computer, the computer comprising a wireless driver configured to communicatively couple the computer to a wireless communication network; and
    a sensor array having a plurality of sensors adapted to provide data on a plurality of local conditions at the game feeder, the sensor array being communicatively coupled to the computer;
        wherein the computer is configured to receive the data on the plurality of local conditions from the sensor array and send the data on the plurality of local conditions to the wireless communication network;
        wherein the computer further comprises:
    a processor;
    a motor controller communicatively coupled to the processor and configured to provide a drive signal to the motor relay; and
    a sensor bus communicatively coupling the plurality of sensors to the processor;
        wherein the computer is further configured to create a summary log of the data received from the sensor array, transmit the summary log to the wireless communication network, receive a feed disbursement directive from the wireless communication network, and responsive to the feed disbursement directive, send a signal to the motor relay; and
        wherein the sensor array comprises a camera.

2. The game feeder of claim 1, wherein the computer is further configured to receive a camera directive from the wireless communication network, the camera directive selecting a trigger event for the camera to take photographs.

3. The game feeder of claim 2, wherein the trigger event is a motion signal from a motion detector in the camera.

4. The game feeder of claim 1, wherein the sensor array further comprises a rainfall sensor, a barometer, a thermometer, and a hydrometer.

5. A system for remotely monitoring and controlling a game feeder, the system comprising:
    a game feeder comprising a container for holding feed, a motor configured to disperse the feed, and a motor relay configured to actuate the motor;
    a computer, the computer comprising a wireless driver configured to communicatively couple the computer to a wireless communication network; and
    one or more of sensors adapted to provide data on local conditions at the game feeder, the one or more sensors communicatively coupled to the computer; and
    a remote server communicatively coupled to the wireless communication network;
        wherein the computer is configured to receive the data from the one or more sensors and send the data to the remote server via the wireless communication network;

wherein the computer is further configured to receive a command sent from the remote server via the wireless communication network;
wherein the command comprises an instruction to drive the motor relay;
wherein the command comprises an instruction to change a feed disbursement frequency; and
wherein the command comprises an instruction to select a trigger event for the camera to take photographs.

6. The system of claim 5, wherein the wireless communication network comprises General Packet Radio Service (GPRS).

7. The system of claim 5, further comprising a workstation communicatively coupled to the remote server.

8. The system of claim 5, wherein a user issues the command on the workstation and the workstation sends the command to the remote server.

9. An apparatus for providing remote monitoring capability to a ground-based game feeder, the ground-based game feeder comprising a trough for holding feed, a motor configured to disperse the feed, a motor control relay, and a motor detector, the apparatus comprising:
- a sensor array providing a plurality of sensors adapted to provide data on conditions local to the game feeder, the sensor array comprising:
- a rainfall sensor;
- a barometer;
- a thermometer;
- a hydrometer; and
- a camera;
- a single board computer, the single board computer comprising:
- a processor;
- a system bus communicatively coupling the processor to system peripherals;
- a sensor bus communicatively coupling the sensors to the system bus;
- a non-volatile storage medium for holding permanent data;
- a serial driver configured to drive the motor control relay;
- an antenna driver communicatively coupling the processor to an antenna configured to couple to a wireless communication network; and
- a high-speed main memory being programmed with:
- an embedded operating system;
- software drivers facilitating communication between the processor and peripheral devices; and
- a master program;
  - wherein the master program includes software instructions that, when executed by the processor, are configured to instruct the processor to:
- receive environmental data from the sensors;
- create a summary log of the environmental data;
- send the summary log to the antenna driver;
- receive feed disbursement directives on the antenna driver; and
- responsive to the feed disbursement directives, deliver a signal to the serial driver configured to cause the motor to disperse the feed.

* * * * *